United States Patent

Van Berkum et al.

[11] Patent Number: 5,818,909
[45] Date of Patent: Oct. 6, 1998

[54] AGENT SPEECH DETECTOR SYSTEM AND METHOD FOR USE WITH A TELEPHONIC SWITCH

[76] Inventors: Paul E. Van Berkum, 612 Easton Ave., Geneva, Ill. 60134; Doug Gisby, 10 Sheffield Court, Lincolnshire, Ill. 60069

[21] Appl. No.: 718,668

[22] Filed: Sep. 27, 1996

[51] Int. Cl.⁶ ............................. H04M 1/64; H04M 3/00
[52] U.S. Cl. ..................... 379/80; 379/265; 379/266; 379/309; 379/80; 379/67; 379/88
[58] Field of Search .................. 379/265, 266, 379/67.1, 88.01, 80, 309

[56] References Cited

U.S. PATENT DOCUMENTS

| | | | |
|---|---|---|---|
| 4,410,765 | 10/1983 | Hestad et al. | 364/467 |
| 5,073,921 | 12/1991 | Nomura et al. | 379/88 |
| 5,309,504 | 5/1994 | Morganstein | 379/265 |
| 5,371,787 | 12/1994 | Hamilton | 379/88 |
| 5,465,286 | 11/1995 | Clare et al. | 379/265 |
| 5,535,256 | 7/1996 | Maloney et al. | 379/266 |
| 5,621,789 | 4/1997 | McGalmont et al. | 379/265 |

*Primary Examiner*—Harry S. Hong
*Assistant Examiner*—Benny Q. Tieu
*Attorney, Agent, or Firm*—Welsh & Katz, Ltd.

[57] ABSTRACT

An agent speech detector system 100 includes an agent terminal 112 which detects whether an agent speaks during a telephone call routed to the agent by a telephonic switch 102. An interface circuit 104 may interconnect the agent terminal 112 and the telephonic switch 102. A call begin circuit 216 detects the beginning of a telephone call and notifies a speech detector 218. The speech detector 218 monitors the voice of the agent until a call termination circuit 220 indicates that the telephone call has terminated. If the speech detector 218 detects that the agent did not speak during the telephone call, it notifies a communications circuit 222 which automatically transmits this information to a supervisor computer system 105.

8 Claims, 2 Drawing Sheets

AGENT SPEECH DETECTOR SYSTEM AND METHOD FOR USE WITH A TELEPHONIC SWITCH

BACKGROUND OF THE INVENTION

The present invention relates generally to telephonic switches for routing incoming telephone calls to agents and, more particularly, to an agent speech detector and method wherein agent speech is monitored during a telephone call routed from a telephonic switch to determine whether an agent speaks during the telephone call.

Telephonic switches are increasingly being used by businesses to automatically route customer telephone calls to available agents. One common type of telephonic switch is an automatic call distributor (ACD) which generally includes a multiport switch controlled by a central processing unit to interconnect the customers and the agents. An example of one such ACD is disclosed in U.S. Pat. No. 5,140,611 issued to Jones et al. on Aug. 18, 1992, entitled "Pulse Width Modulated Self-Clocking and Self-Synchronizing Data Transmission and Method for a Telephonic Communication Network Switching System", the disclosure of which is hereby incorporated by reference.

ACD systems provide for acquiring, processing and reporting information concerning different aspects of activity within the system. Typically, this information is presented in printed reports and/or displayed on a display terminal to a supervisor or agent. Based on this information, supervisory personnel and agents are able to evaluate the handling of calls within the automatic call distributor and, if necessary, make changes for more efficient ACD system operation.

Very little information relating to the actual conversation between an agent and a caller is reported by the prior ACD systems. A telephone call is reported by the system as being answered when it is dropped into the agent headset. If an agent remains silent when the call is received, the caller will understandably hang up. Unfortunately, the system will report that the agent handled the call when, in fact, the agent never spoke.

With prior systems, a supervisor would need to listen during the telephone call to detect such actions by the agents. This is unacceptable for several reasons. First, a supervisor would have to waste valuable time monitoring calls which are handled correctly in order to detect an agent who is not speaking to callers. Second, the supervisor has no way of limiting the number of agents to monitor for such activity. A caller who received no answer obviously could not identify the agent who failed to answer the call and, as noted, the reports generated by the ACD system would not identify such an agent.

Accordingly, there is a need in the art for an agent speech detector and method which monitors agent speech during a telephone call routed from a telephonic switch to an agent to determine whether an agent spoke during the telephone call and which automatically notifies supervisory personnel when an agent does not speak during a telephone call.

SUMMARY OF THE INVENTION

This need is met by an agent speech detector system and method in accordance with the present invention wherein an agent terminal detects when a telephone call is received by an agent, monitors whether the agent speaks, detects the termination of the telephone call and automatically notifies a supervisor computer system if the agent does not speak during the telephone call.

In accordance with one aspect of the present invention, an agent speech detector system for use with a telephonic switch detects whether an agent speaks during a telephone call routed to the agent. The agent speech detector system comprises an agent terminal which detects whether an agent speaks during a telephone call from a caller received from the telephonic switch. The agent speech detector system preferably includes an interface circuit for providing audio communications between the telephonic switch and the agent terminal. The detector system may comprise a speaker for providing audio communications from the caller to the agent and/or a microphone for providing audio communications from the agent to the caller through the telephonic switch.

To assure prompt identification of a problem, a supervisor computer system reports whether the agent spoke during the telephone call in response to the agent terminal. Preferably, the agent terminal automatically notifies the supervisor computer system, through a communications circuit, when an agent does not speak during a telephone call.

In accordance with another aspect of the present invention, a method detects whether an agent speaks during a telephone call routed from a telephonic switch to an agent terminal. The method comprises the steps of: detecting a beginning of the telephone call; monitoring the telephone call to determine whether the agent speaks during the telephone call; and indicating whether the agent spoke during the telephone call. The method may further comprise the step of automatically notifying supervisory personnel when the agent did not speak during the telephone call. The step of automatically notifying may comprise the step of automatically sending signals indicating that the agent did not speak during the telephone call to a supervisory computer system.

These and other features and advantages of the present invention will become apparent from the following detailed description, the accompanying drawings and the appended claims.

DETAILED DESCRIPTION OF THE INVENTION

Figure 1:
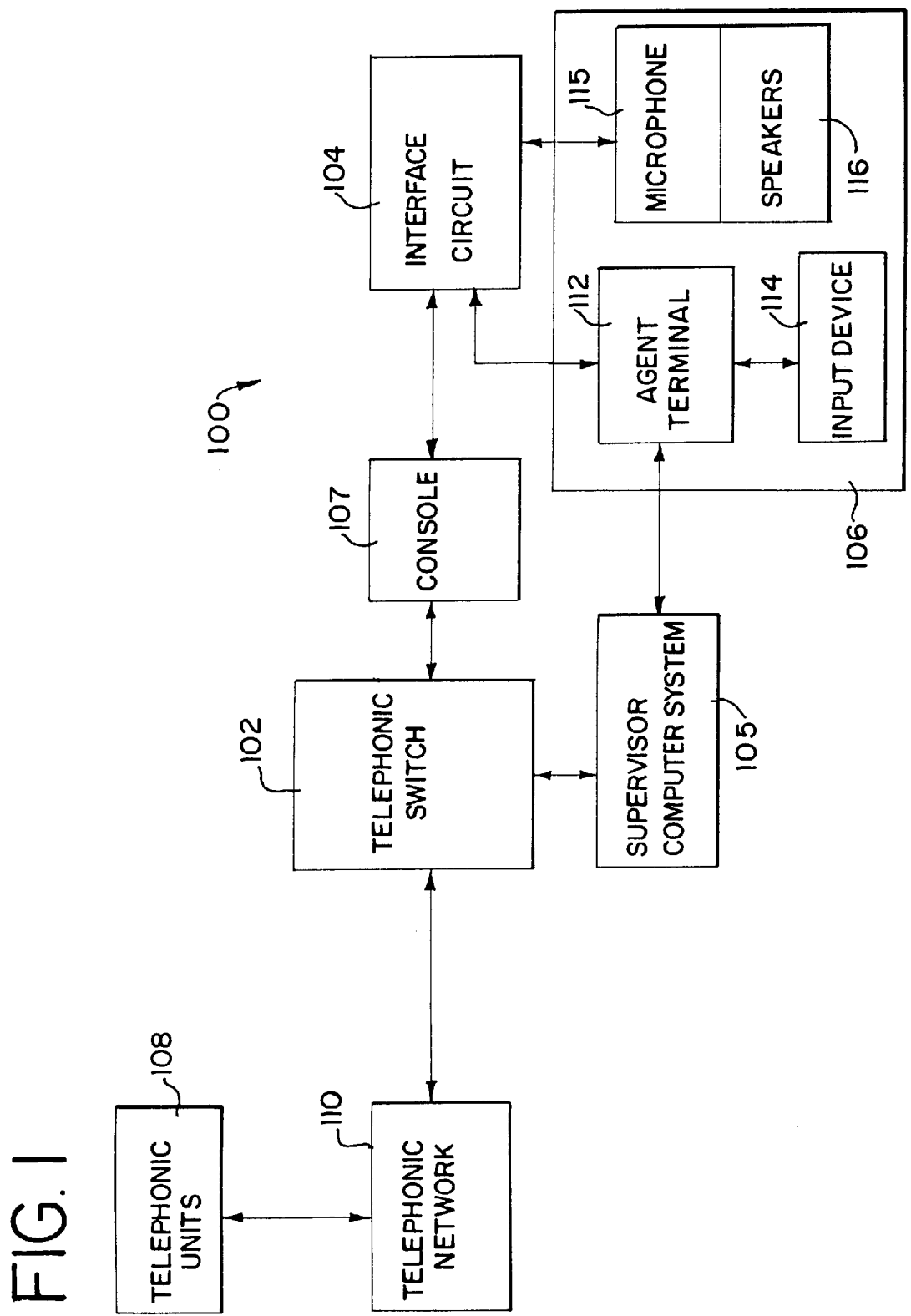
FIG. 1 is a system block diagram of an agent speech detector system including an agent terminal and interface circuit in accordance with the present invention.
Figure 2:
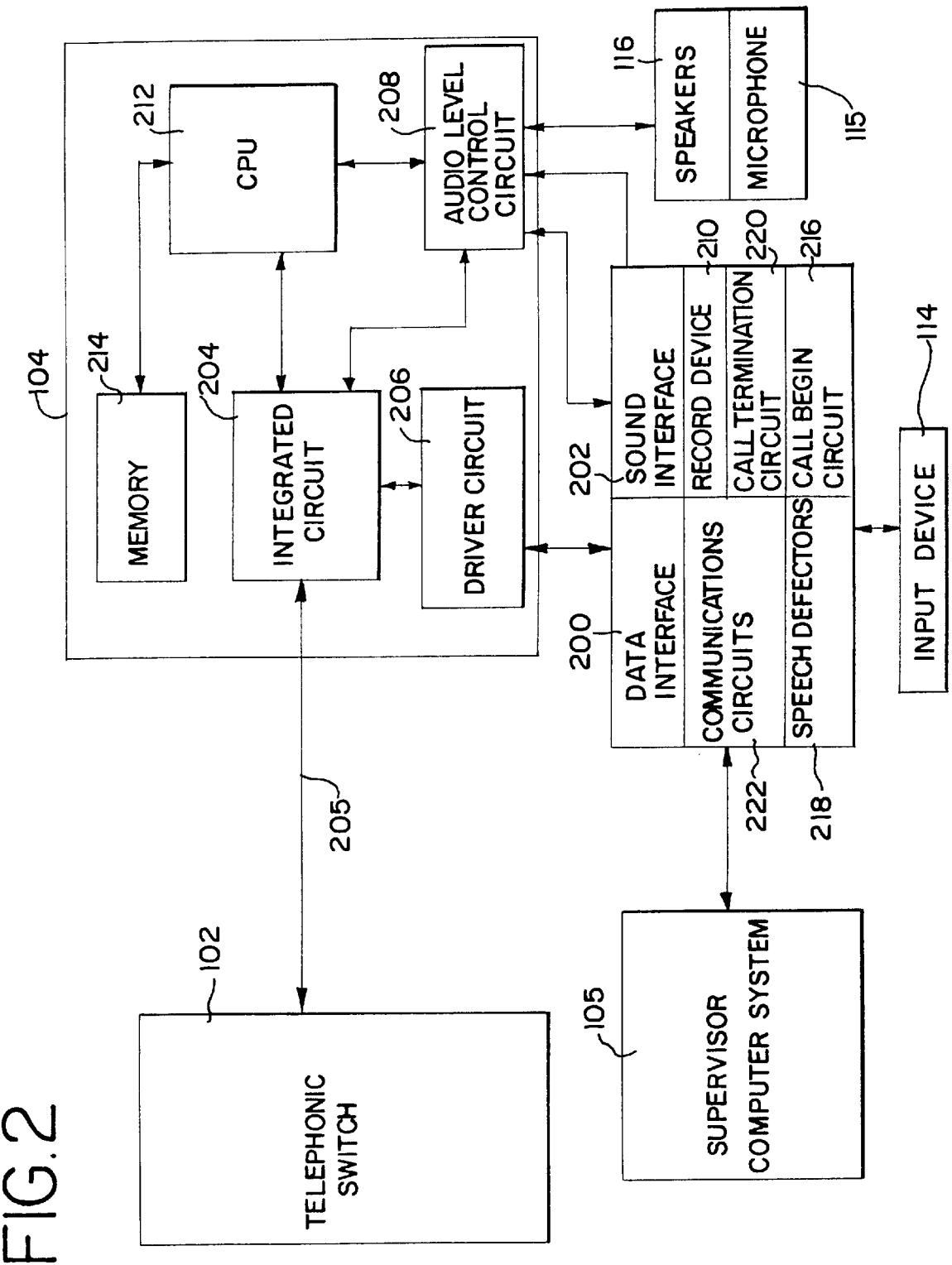
FIG. 2 is a schematic block diagram showing details of the agent terminal and interface circuit illustrated in FIG. 1.

An agent speech detector system 100 connected to a telephonic switch 102 in accordance with the present invention is shown in FIG. 1 comprising an interface circuit 104, a supervisor computer system 105 and an agent unit 106. An agent console 107 may be interposed between the interface circuit 104 and the telephonic switch 102. The interface circuit 104 may be connected to a headset connection in the agent console 107 such that audio and data communications pass through the agent console 107 to the interface circuit 104. Alternatively, as shown in FIG. 2, the interface circuit 104 may be directly connected to the telephonic switch 102. The telephonic switch 102, preferably an automatic call distributor (ACD), routes telephone calls generated by callers at telephonic units 108 and transmitted over a telephonic network 110. An example of an ACD which may be advantageously employed in the present invention is disclosed in U.S. Pat. No. 5,140,611, the disclosure of which was incorporated herein by reference.

The agent unit 106 is comprised of an agent computer consisting of an agent terminal 112 and an input device 114, such as a keyboard or mouse. A data interface 200 and a sound interface 202, both shown in FIG. 2, in the agent terminal 112 provide data and audio communications between the telephonic switch 102 and the agent terminal 112. The agent terminal 112 further includes conventional computing devices, such as one or more microprocessors, memory devices and the like. A headset provides audio communications between the agent and the caller through the telephonic switch 102. The headset typically includes a microphone 115 and one or more speakers 116.

The interface circuit 104 interfaces the agent unit 106 and the telephonic switch 102 or, if present, the console 107. The interface circuit 104 accommodates both audio communications and data communications being transferred to and from the telephonic switch 102. As shown in greater detail in FIG. 2, the interface circuit 104 includes an integrated circuit 204 for communicating with the telephonic switch 102. Those skilled in the art will readily comprehend that the telephonic switch 102 and the interface circuit 104 may preferably communicate over an integrated services digital network (ISDN).

If the interface circuit 104 is connected to the agent console 107, various connection configurations may be implemented in the present invention. It is contemplated that the interface circuit 104 will be connected to the agent console 107 through the headset connection in the console 107. As those skilled in the art will understand, the headset connection in the agent console 107 may be one of many types. For example, the headset connection may be a conventional 2 wire standard headset interface or a 4 wire standard headset interface. Both the two wire and four wire interfaces can be readily accommodated by the interface circuit 104 of the present invention.

For ease of description, audio communications from the telephonic switch 102 will be designated as switch audio communications, or caller audio communications. Audio communications generated by the agent terminal 112 will be designated as terminal audio communications. Finally, voice signals generated by an agent at the microphone 115 will be designated as agent audio communications.

In operation, the switch audio and data communications are transmitted over a link 205, which may be ISDN, to the integrated circuit 204. The integrated circuit 204 routes the data communications to a driver circuit 206 for further transmission to the data interface 200 in the agent terminal 112. Preferably, the driver circuit 206 and the agent terminal 112 are connected via a conventional RS232 connection. The transmitted data is used by the agent to access stored data concerning the caller, or the call, and to generate visual displays. A discussion of one such data retrieval, manipulation and display in a telephonic switching system may be found in U.S. Pat. No. 5,479,497 issued to Kovarik on Dec. 26, 1995, entitled "Automatic Call Distributor With Programmable Window Display System And Method", the disclosure of which is hereby incorporated by reference.

The switch audio communications are sent to an audio level control circuit 208 and transmitted to the sound interface 202 and the speakers 116 of the headset. Accordingly, the voice of the caller is heard by the agent through the headset and may be recorded by a record device 210 in the agent terminal 112. The integrated circuit 204 and the audio level control circuit 208 are controlled by a central processing unit (CPU) 212. The CPU 212 typically operates in accordance with software stored in a memory 214.

In addition, the agent terminal 112 may play recorded announcements, or terminal audio communications, to the caller from a conventional sound card. The agent terminal 112 may be programmed to play stored announcements based on the received data communications or any other characteristics of the call. The agent listens to the announcements planned by the agent terminal 112 through the speakers 116. After the appropriate announcements are played, the agent continues the telephone call through the headset. Similarly, the agent voice, or agent audio communications, are provided to the sound interface 202 through the audio level control circuit 208.

The agent terminal 112, in accordance with the present invention, detects whether the agent speaks during a telephone call. A call begin circuit 216 detects when a telephone call has been received at the agent terminal 112 and notifies a speech detector 218. A call termination circuit 220 detects when the telephone call has ended and so notifies the speech detector 218.

During the telephone call, the speech detector 218 monitors the transmission of voice from the agent through the microphone 115, the audio level control circuit 208 and the sound interface 202. As those skilled in the art will readily comprehend, monitoring of the agent voice signals may be done in a number of well known manners, such as by detectin the energy level of signals generated by the microphone 115. If the speech detector 218 does not detect voice communications from the agent during the telephone call, the speech detector 218 notifies a communications circuit 222. The communications circuit 222 then automatically notifies the supervisor computer system 105 over a local area network, or other computer network, that the agent did not speak during the telephone call. The communications circuit 222 may download additional information relating to the telephone call, such as length of the telephone call, the time of the telephone call and the like, to the supervisor computer system 105.

The structure, control and arrangement of the conventional components and circuits have, for the most part, been illustrated in the drawings by readily understandable block representations and schematic diagrams. The drawings show only those specific details that are pertinent to the present invention in order not to obscure the disclosure with structural details which will be readily apparent to those skilled in the art having the benefit of the description herein.

Having thus described the invention in detail by way of reference to preferred embodiments thereof, it will be apparent that other modifications and variations are possible without departing from the scope of the invention defined in the appended claims. Therefore, the spirit and scope of the appended claims should not be limited to the description of the preferred versions contained herein.

What is claimed is:

1. An agent speech detector system for use with a telephonic switch, the system comprising:

An agent terminal operatively coupled to the telephonic switch;

an interface circuit connected between the telephonic switch and the agent terminal;

a call begin circuit, a call termination circuit, and a speech detection circuit, operatively coupled to the interface circuit, the speech detection circuit configured to determine whether, during a call from a caller received from the telephonic switch, an agent spoke to the caller; and the agent terminal configured to provide an indication to a supervisor whether, during the call, the agent spoke to the caller within a predetermined period of time from a beginning of the telephone call.

2. The agent speech detector system as recited in claim 1 further comprising:

a speaker for providing audio communications from caller to the agent.

3. The agent speech detector system as recited in claim 1 further comprising:

a microphone for providing audio communications from the agent to the caller through the telephonic switch.

4. The agent speech detector system as recited in claim 1 comprising:

a supervisor computer system configured to receive the indication and report whether the agent spoke during the telephone call.

5. The agent speech detector system as recited in claim 1 wherein the agent terminal further includes:

a communications circuit for receiving the indication and configured to automatically notify a supervisor computer system when the agent does not speak during the telephone call in response to the call termination circuit detecting the termination of the telephone call.

6. A method for detecting whether an agent speaks during a telephone call routed from a telephonic switch to an agent terminal, the method comprising the steps of:

detecting a beginning of the telephone call;

monitoring the telephone call at the agent terminal to determine whether the agent fails to speak within a predetermined period of time after the beginning of the telephone call;

detecting a termination of the telephone call; and notifying a supervisor if the agent did not speak during the telephone call.

7. The method as recited in claim 6 wherein the step of indicating comprises the step of:

automatically notifying supervisory personnel when the agent did not speak during the telephone call.

8. The method as recited in claim 7 wherein the step of automatically notifying comprises the step of:

automatically sending signals indicating that the agent did not speak during the telephone call to a supervisory computer system.

* * * * *